United States Patent
Grussaute-Nghiem et al.

(10) Patent No.: US 8,057,615 B2
(45) Date of Patent: Nov. 15, 2011

(54) METHOD OF APPLYING AN ANTI-FREEZE FILM TO A TRANSPARENT SUBSTRATE

(75) Inventors: Helene Grussaute-Nghiem, Arsy (FR); Marie-isabelle Watchi, Paris (FR); Yves Demars, Clermont (FR); Gilles Lonchampt, Le Plessis Brion (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 12/690,967

(22) Filed: Jan. 21, 2010

(65) Prior Publication Data

US 2010/0116416 A1    May 13, 2010

Related U.S. Application Data

(62) Division of application No. 11/815,049, filed as application No. PCT/FR2006/050073 on Jan. 30, 2006.

(30) Foreign Application Priority Data

Jan. 31, 2005 (FR) ..................... 05 50271

(51) Int. Cl.
*B29C 65/64* (2006.01)

(52) U.S. Cl. .......... 156/87; 156/80; 156/108; 428/321.1

(58) Field of Classification Search ............... 428/320.2, 428/321.1, 343; 156/87, 80, 108
See application file for complete search history.

(56) References Cited

U.S. PATENT DOCUMENTS

| 2,471,718 | A | | 5/1949 | Lawrence |
| 3,977,930 | A | * | 8/1976 | Hunter ........................... 156/71 |
| 6,144,017 | A | | 11/2000 | Millett et al. |
| 6,627,319 | B2 | * | 9/2003 | Jacquiod et al. ............. 428/448 |
| 7,003,920 | B1 | * | 2/2006 | Messere et al. ............. 52/204.5 |
| 2005/0139783 | A1 | * | 6/2005 | Kubota et al. ............. 250/484.4 |

FOREIGN PATENT DOCUMENTS

| DE | 35 21 250 | 12/1985 |
| DE | 41 22 963 | 10/1992 |
| EP | 0 352 180 | 1/1990 |
| EP | 0 498 005 | 8/1992 |
| FR | 2 794 225 | 12/2000 |

* cited by examiner

*Primary Examiner* — Katarzyna Wyrozebski Lee
*Assistant Examiner* — Vishal I Patel
(74) *Attorney, Agent, or Firm* — Oblon, Spivak, McClelland, Maier & Neustadt, L.L.P.

(57) ABSTRACT

Disclosed is a process for adhering a flexible film to a substrate by interpositioning between the film and the substrate of a sufficient amount of a liquid, so that no bubbles are trapped between the film and the substrate after the film has been applied to the substrate using a scraper and where the liquid does not freeze at a substrate temperature below 0° C.

8 Claims, No Drawings

METHOD OF APPLYING AN ANTI-FREEZE FILM TO A TRANSPARENT SUBSTRATE

The present invention relates to substrates that are occasionally or permanently at temperatures below 0° C., especially transparent substrates.

Various functionalities can be given to such substrates: anti-frost allowing the transparency to be protected, hydrophobic, hydrophilic, anti-soiling/self-cleaning (photocatalytic), reflecting light or thermal radiation, at least partly coloured, electrically conducting/heating, semiconductive, antistatic, electroluminescent, etc.

Several of these functions may be combined on the substrate, for example in the form of a coating. In this case, the process for forming the coating is adapted in order to guarantee the desired adhesion and mechanical strength and, in particular, a scratchability that is as low as possible or a self-healing ability of the scratches in the coating, when the substrate is transparent. Of course, the coating is regenerated when necessary.

On the other hand, one or more functions may be provided by an adhesive film, having the advantage of being easy to replace with an identical film or a film having different functions.

Obviously in that case it is attempted to obtain a perfect adhesion quality of the film on the substrate, in particular by avoiding trapping air bubbles between the two. In order to do this, one process may consist in interposing a sufficient amount of a liquid, especially water as a mixture with a surfactant, in order to make it possible to expel all the bubbles by applying a pressure to the film, for example from its central portion to its periphery, using a scraper.

This process does not however give satisfactory results for substrates that are, occasionally or permanently, at temperatures below 0° C. Indeed for them, the fraction of liquid that remains between the substrate and the film after they have been assembled is capable of crystallizing by forming frost. Thus when the functional adhesive film is applied to an inner side of a transparent refrigerated cabinet door, of which the temperature may be between, for example, −28 and 0° C., frost is formed so that it is no longer possible to see through the door. Due to the permeability of the film and the relative dryness of the refrigerated atmosphere, the frost is likely to disappear, at least four days to more than a week after its formation. Such an inconvenience prevents its use as a vertical door for a refrigerated cabinet in a superstore, the opening frequency of which by customers or for restocking results in permanent frost, whereas keeping perfect transparency is essential in the field of hypermarkets and supermarkets.

The object of the invention is therefore to make available a process for assembling a flexible film to a substrate guaranteeing a perfect interside between the two and, especially, the absence of trapped air bubbles and frost formation.

For this purpose, one subject of the invention is a process for adhering a flexible film to a substrate, comprising the interposition between film and substrate of a sufficient amount of a liquid, so that no bubbles are trapped between film and substrate after the film has been applied to the substrate using a scraper, characterized in that the liquid does not freeze at a substrate temperature that is occasionally or permanently below 0° C., especially of at most −5° C. and in particular of at most −10° C., and also of at least −25° C.

Advantageously, the substrate is cleared of any particles that are bonded thereto, cleaned and dried, prior to the interposition of a sufficient amount of a liquid between film and substrate.

Preferably, the side of the flexible film to be adhered to the substrate is wetted with said sufficient amount of a liquid. All suitable techniques for depositing liquid, such as flow coating, spray coating or equivalent, may be used. It is not on the other hand excluded to wet the side of the substrate onto which the film is to be adhered with said sufficient amount of a liquid, nor to wet both said sides of the film and said side of the substrate.

According to another preferred feature of the process of the invention, the side of the flexible film to be adhered to the substrate comprises an adhesive layer optionally equipped with a protective film to be removed before adhesion to the substrate. Alternatively, an adhesive may be incorporated into the liquid interposed between film and substrate.

The adhesives may be chosen from:
  hot-melt adhesives: thermoplastic polymers heated to obtain a liquid having the appropriate viscosity for being deposited then cooled to obtain a solid (polyethylene, ethylene/vinyl acetate copolymer, polyamide, polyester, etc.);
  adhesives in aqueous or organic solution or dispersion, of which the solvent is evaporated after deposition to obtain a solid:
    in aqueous solution: phenolic adhesive, polyvinyl methyl ether, polyvinyl alcohol, dextrin, natural product such as casein, blood-based glue (serum globulin and albumin), and fish glue (derived from collagen);
    in organic solution: natural rubber, acrylic, polyurethane, polyamide, polyvinyl acetal, phenoxy; and
    in dispersion: polyurethane, epoxy, silicone, certain elastomers (nitrile rubber, etc.);
  adhesives in the form of ready-to-use films: epoxy, phenolic, nitrile rubber, polyamide, polyvinyl butyral, polyvinyl chloride, ethylene/carboxylic acid copolymer;
  adhesives involving in situ polymerization reactions: cyanoacrylates, certain reactive acrylics;
  pressure-sensitive adhesives: do not change physical state before and after application, remain permanently deformable and have a certain sticky character (tack) at room temperature: tackified elastomers (natural rubber-latex), ethylene/vinyl acetate copolymer, thermoplastic elastomer (polyurethane, etc.), styrene-diene (styrene-butadiene-styrene, styrene-isoprene-styrene) block copolymer, polyalkyl acrylate, silicones;
  elastomers: natural rubber, styrene/butadiene rubber, polychloroprene, neoprene, nitrile rubber, butyl rubber; and
  inorganic adhesives: silicates that are soluble at various silica/alkali metal proportions.

According to preferred embodiments of the process of the invention:
  the side of the flexible film opposite to that to be adhered to the substrate is wetted with an effective amount of liquid so that the scraper slides easily over the film during the operation that consists in applying the film to the substrate;
  the side of the flexible film opposite to that to be adhered to the substrate is equipped with a protective film to be removed after the adhesion of the flexible film to the substrate; this protective film is especially capable of being wetted in order to facilitate sliding of the scraper as indicated previously; and,
  the liquid interposed between film and substrate comprises an effective amount of an antifreeze compound that lowers the crystallization temperature, such as a salt, especially KCl, NaCl or equivalent in solution and/or alcohol, and/or a suitable hydrophilic polymer, copolymer, prepolymer or oligomer, optionally in water, and optionally one or more surfactants.

Ethanol and isopropanol are especially used as alcohols.

The hydrophilic polymers, copolymers, prepolymers or oligomers that make up the interposed liquid are especially based on polyvinylpyrrolidone of the poly(n-vinyl-2-pyrrolidone) or poly(1-vinylpyrrolidone) type, polyvinylpyridine of the poly(n-vinyl-2-pyridine) type, of the poly(n-vinyl-3-pyridine) type or of the poly(n-vinyl-4-pyridine) type, polyacrylate of the poly(2-hydroxyethyl acrylate) type, polyacrylamide of the poly(N',N-hydroxyacrylamide) type, polyvinyl acetate, polyacrylonitrile, polyvinyl alcohol, polyacrolein, polyethylene glycol, polypropylene glycol and polyoxyethylene. In particular, the copolymers are based on at least one of the monomers forming these polymers.

As surfactants, mention may be made of compounds comprising a lipophilic part Y, which may be a linear, branched or unsaturated aliphatic chain or an aromatic or alkyl aromatic chain, and an ionic or nonionic hydrophilic head.

Examples of these are:

anionic surfactants: Y—$CO_2^-M^+$; Y—$OSO_3^-M^+$; Y—$SO_3^-M^+$; dodecylbenzene sulphonate; alkyl sulphonate; sulphonated fatty acid and fatty acid ester; and alkylarylsulphonate;

cationic surfactants: Y—$(R)_n NH^+_{(4-n)}$, $X^-$; Y—$R_4N^+$, $X^-$; alkyltrimethylammonium; alkylbenzyl-dimethyl-ammonium; imidazolinium salts; and amine salts;

zwitterionic surfactants: Y—$N^+ \ldots CO_2^-$; Y—$N^+ \ldots SO_3^-$; betaines; sulphobetainesz; and imidazolium salts; and nonionic surfactants: Y—OR; Y—OH; Y—$CO_2R$; Y—CONHR; Y—$(CH_2—CH_2—O)_n$; polyol; alcohol; acid, ester; and polyethoxylated fatty alcohol.

Another subject of the invention is formed by a mutually adhered substrate and flexible film obtained with interposition of a sufficient amount of a liquid in the absence of any trapped bubbles, characterized by the persistent absence of frost in the event of moving the substrate and film into an atmosphere where their temperature will be below 0° C., respectively of at most −5° C. and −10° C., from an atmosphere having a temperature at least equal to 0, preferably between 10 and 35, especially 15 and 30 and in particular 23 and 27° C. and residual humidity of at least 25%.

According to one preferred feature, the substrate and flexible film form a transparent assembly. The substrate is made of glass or a plastic such as polycarbonate, polypropylene, polymethyl methacrylate, ethylene/vinyl acetate copolymer, polyethylene terephthalate, polybutylene terephthalate, polyurethane, polyvinyl butyral, cycloolefinic copolymer such as ethylene/norbornene or ethylene/cyclopentadiene, polycarbonate/polyester copolymer, ionomer resin such as ethylene/(meth)acrylic acid copolymer neutralized by a polyamine, and similar, alone or as blends.

According to other advantageous features of the substrate and flexible film of the invention:

the film is an anti-frost film and/or is hydrophobic and/or is hydrophilic and/or anti-soiling/self-cleaning (photocatalytic) and/or reflects light or thermal radiation, is a solar protection film, is a low-emissivity film and/or is coloured at least partly and/or is electrically conducting/heating and/or is semiconductive and/or antistatic and/or electroluminescent;

the film is an anti-frost film and, when at a temperature of at most −10° C., respectively −15° C. and −20° C., it is placed in an atmosphere having a temperature at least equal to 0, preferably between 10 and 35, especially 15 and 30 and in particular 23 and 27° C. and at least 25% residual humidity, no frost forms for at least 12 s, preferably at least 1 min, in particular at least 2 min, even as long as at least 3 min;

the film is based on a support made of polyamide, polyester, polyolefin such as polyethylene or polypropylene, of cellulose, polystyrene, ethylene/vinyl acetate copolymer, polyvinyl alcohol, polyvinyl chloride, polyethylene terephthalate, polymethyl methacrylate, polycarbonate, polyvinyl butyral, polyurethane, polyvinylpyrrolidone, polyvinylpyridine, polyacrylate of the poly(2-hydroxyethyl acrylate) type, polyacrylamide, polyvinyl acetate, polyacrylonitrile, polyacrolein, polyethylene glycol, polyoxyethylene; it may also be a copolymer or a blend based on at least one of the polymers mentioned above;

the film is an anti-frost film due to the fact that it comprises an antifreeze compound that lowers the crystallization temperature and has, optionally, a hydrophobic character over part of its surface. As an antifreeze compound, it is possible to use the same ones as described above for said interposed liquid. However, durability of the anti-frost functionality of the film is sought, which may require improving the mechanical strength of the layer incorporating the antifreeze compound, in particular when this layer is likely to be subjected to an occasional mechanical contact, or to cleaning, etc. For this purpose, the antifreeze compound may be crosslinked and/or combined with at least one compound having a physical interaction with it and/or dispersed in a solid, for example mineral, or mixed matrix, the mixed matrix being of the ORMOCER (Organically Modified Ceramics) type.

The term "physical interaction" is understood here to mean a hydrogen bond, a polar interaction of the Van der Waals type or a hydrophobic interaction able to produce a mechanical reinforcement comparable to crosslinking.

The anti-frost function may be incorporated into the film itself or into a coating formed on the support for the film.

Another subject of the invention is glazing comprising a substrate and flexible film as described previously, and also optionally other transparent sheets to which they are connected via intermediate adhesive layer(s) or gas-filled cavity or cavities. Said flexible film advantageously forms an outer side of this thus functionalized glazing.

The glazing especially consists of monolithic, laminated, multiple, insulating, vacuum glazing.

Such a multiple insulating glazing has for example two or three sheets of monolithic or laminated glass separated in pairs by a gasfilled cavity. The advantage therein may be the thermal insulation of a refrigerated cabinet with respect to the outside atmosphere (of a shop, etc.).

This thermal insulation is alternatively obtained by a vacuum glazing comprising at least two sheets of monolithic or laminated glass separated by a vacuum or a gas-filled cavity at reduced pressure. These two sheets may be combined with a third from which they are separated by a gas-filled cavity that may or may not be at reduced pressure.

Such structures may comprise one or more low-emissivity layers that reflect the heat radiated by the outside of the refrigerated cabinet.

According to one advantageous feature of this glazing, the thermal conductivity of its barrier, that is to say all the elements by which the various constituent sheets of monolithic or laminated glass are kept together and spaced in pairs, is at most 1.46 W/m.K.

Finally, one subject of the invention is the application of such glazing:

as a door of a refrigerated cabinet;
  for the building industry, street furniture or poster panels, traffic mirrors and the elements of a refrigerated cabinet other than the door, such as shelves, etc.;
  for a terrestrial, airborne or waterborne transport vehicle (windscreen, side window, rear window, part of the roof, rear view mirror, headlight); and
  for a viewing element (spectacles, helmet visor).

The invention is indeed particularly benefited from for products subjected, at least occasionally, to temperatures below 0° C., and has an increased advantage for outside applications in harsh climatic conditions.

The invention will be better understood in the light of the following example.

EXAMPLE

The first example of Application WO 00/71481 was repeated except that:
  a triple insulating glazing was used instead of an insulating vacuum glazing; and that
  the polycarbonate film was equipped with an adhesive layer oriented towards the insulating glazing, to which the film was attached with interposition of a liquid specified below.

The polycarbonate film was coated, on the side opposite that of the adhesive layer, with an adsorbent anti-frost layer forming a three-dimensional polymer network based on polyvinylpyrrolidone and on polyurethane. The thickness of the anti-frost layer was equal to 14.5 μm.

Tests were carried out on doors installed on refrigerated sales cabinets within which a temperature of −25.5° C. was maintained. The temperature measured on the inner side of the door was −22° C. The cabinets were placed in an atmosphere at a temperature of 25° C. and 60% residual humidity.

The tests were carried out in the following manner.

The door of the cabinet was opened 10 min before fitting the film in order to avoid the formation of frost on the glass.

The inner side of the door was wetted using a sprayer filled with a washing composition (soapy water).

The glass was scraped with a scraper in order to remove all the particles that were stuck to it, then with a rubber squeegee to wipe off the water. There should no longer have been any frost on the door. If necessary, the edges could be wiped with a rag.

The protective film was removed from the adhesive of the polycarbonate film and the liquid indicated in the table below was sprayed onto the adhesive.

The adhesive side of the film was applied to the glass.

The other side of the film was wetted by spraying with the same liquid as on the adhesive, so that the rubber squeegee slid easily over the film.

Using the rubber squeegee, the liquid that was between the glass and the film was expelled. For a perfect expulsion of the liquid, the scraping was carried out from the centre of the glazing towards the outside.

If necessary, the film was cut so as to leave a gap of a few mm between the door posts and the film in order to promote the expulsion of the liquid.

The scraping operation was repeated and the door of the cabinet was closed.

Evaluated in the table below is the presence or absence of frost at various times after closing the door, and also the presence or absence of bubbles between the glass and the film.

TABLE

| Liquid used | Frost | | | Bubbles |
|---|---|---|---|---|
| | 20 min | 16 h | 24 h | |
| Water + Mir (1 drop/litre) | Yes | Yes | Yes | No |
| 10% ethanol + 90% water | Yes | Yes | Yes | No |
| 50% ethanol + 50% water | No | No | No | No |
| 50% ethanol + 50% water + 1 drop of Triton X | No | No | No | No |
| 100% isopropanol | No | No | No | No |
| 12% PEG 200 in water | Yes | Yes | Yes | No |
| 50% PEG 200 in water | No | No | No | No |
| PEG 200 | No | No | No | No |

The percentages are indicated by weight.
Mir is a detergent composition sold by Henkel.
Triton X is a mixture of polyethoxylated octylphenols (nonionic surfactant) sold by Union Carbide.
PEG 200 is a polyethylene glycol sold by Merck (Art. 807483).

This table illustrates the possibility of reducing the formation of frost until it is prevented from forming, and thus obtaining a permanent absence of frost.

The invention claimed is:

1. A process for adhering a flexible film to a substrate, comprising interpositioning between the film and the substrate of a sufficient amount of a liquid, so that no bubbles are trapped between the film and the substrate after the film has been applied to the substrate using a scraper, wherein the liquid does not freeze at a substrate temperature below 0° C. wherein the liquid interposed between film and substrate comprises an effective amount of an antifreeze compound selected from the group consisting of KCl, NaCl and a combination thereof that lowers the crystallization temperature in solution and/or alcohol, and/or a suitable hydrophilic polymer, copolymer, prepolymer or oligomer, optionally in water, and optionally one or more surfactants.

2. The process according to claim 1, wherein the liquid does not freeze at a substrate temperature of at most −5° C.

3. The process according to claim 1, wherein the liquid does not freeze at a substrate temperature of at most −10° C.

4. The process according to claim 1, wherein prior to interpositioning between the film and the substrate of a sufficient amount of a liquid, the substrate is cleared of any particles that are bonded thereto, cleaned and dried.

5. The process according to one of claim 1, wherein the side of the flexible film to be adhered to the substrate is wetted with said sufficient amount of a liquid.

6. The process according to claim 1, wherein the side of the flexible film to be adhered to the substrate comprises an adhesive layer optionally equipped with a protective film to be removed before adhesion to the substrate.

7. The process according to claim 1, wherein the side of the flexible film opposite to that to be adhered to the substrate is wetted with an effective amount of liquid so that the scraper slides easily over the film during the operation that consists in applying the film to the substrate.

8. The process according to claim 1, wherein the side of the flexible film opposite to that to be adhered to the substrate is equipped with a protective film to be removed after the adhesion of the flexible film to the substrate.

* * * * *